Oct. 29, 1957     E. F. BRILL     2,811,107
ELECTROMAGNETIC CENTRIFUGAL PUMP WITH DIFFUSER VANES
Filed Sept. 18, 1953     2 Sheets-Sheet 1

Inventor
Edward F. Brill
by I. Lloyd LeFevre
Attorney

United States Patent Office 2,811,107
Patented Oct. 29, 1957

2,811,107

ELECTROMAGNETIC CENTRIFUGAL PUMP WITH DIFFUSER VANES

Edward F. Brill, Brookfield, Wis., assignor to Allis-Chalmers Manufacturing Company, Milwaukee, Wis.

Application September 18, 1953, Serial No. 380,914

10 Claims. (Cl. 103—1)

This invention relates to an electromagnetic pump for electrically conductive fluids in which motion is imparted to the fluid by the action of a rotating magnetic field produced by rotation of a magnet structure.

Such an electromagnetic pump comprises circumferentially spaced field poles rotated in proximity to a thin annulus or annular gap carrying the fluid. The magnetic field is directed through the fluid from one field pole to a backing structure of magnetic material, then back again through the fluid to another field pole of opposite polarity. The field poles are excited by direct current excitation.

The electrically conductive fluid such as a liquid metal tends to rotate in the annulus with the magnetic field. Centrifugal force of the moving metal causes it to flow radially out of the magnetic field as it rotates therein. This liquid metal is drawn into the annulus from an inlet duct or suction end of the centrifugal pump, and pumping action is thereby effected.

This type of pump may be used in a closed system of fluid flow for an electrically conductive fluid, and moving parts or seals are not required for the pump. The fluid flow may be controlled by varying the speed of the rotating magnetic field or by varying the field excitation. For a given fluid and rate of flow the pump may be designed for maximum efficiency.

According to the present invention the electromagnetic centrifugal pump having rotating field poles is designed as a complete sealed unit comprising the pump, the drive motor therefor, and a heat exchanger for cooling the motor and the pump. In the combination liquid metal cannot enter the motor housing and seals therefor are not required. A heat barrier is disposed between the rotating poles and the adjacent wall of the annulus to protect the field coils from the heat of the annulus and of the liquid metal therein. In case of breakdown due to the motor, the field structure, or the heat exchanger, these elements may be removed as a unit and a replacement unit inserted without opening the closed liquid metal circuit and the replacement may be made with a minimum of delay.

The pump efficiency is improved not only in the design for a specific liquid metal and speed of rotation of the magnetic field but also by improving the metal flow and reducing pump losses. The metal is rotated so that it enters the magnetic field with a predetermined angular velocity. The pole pieces for the field poles have their leading and trailing edges shaped like those of a mechanical impeller so that these edges are substantially at right angles to the flow of the liquid metal in the path through the magnetic field. Thus, eddy currents producing no useful torque are substantially reduced.

The efficiency of the pump is also improved by reducing the leakage flux and for certain field pole arrangements this may be obtained by connecting the field poles in pairs with adjacent pairs forming opposite magnetic poles.

It is an object of the present invention to provide an improved electromagnetic centrifugal pump having a rotating magnetic field to effect pumping action of liquid metal in a closed system of fluid flow.

Another object is to provide an electromagnetic centrifugal pump having a heat barrier between rotating field poles and the annulus containing the liquid metal.

Another object is to provide an electromagnetic centrifugal pump having a unit motor and pump field structure in a common housing which permits removal of the motor and pump field structure without opening the fluid annulus to atmosphere.

Another object is to provide ventilation for such pump field structure independent of the ventilation for the motor.

Another object of the invention is to provide thin spaced walls defining the annulus and supporting such walls by guide vanes extending from pump inlet to discharge volute.

Other objects and advantages may be apparent to one skilled in the art upon reading the following description together with the accompanying drawings, in which.

Figure 1:
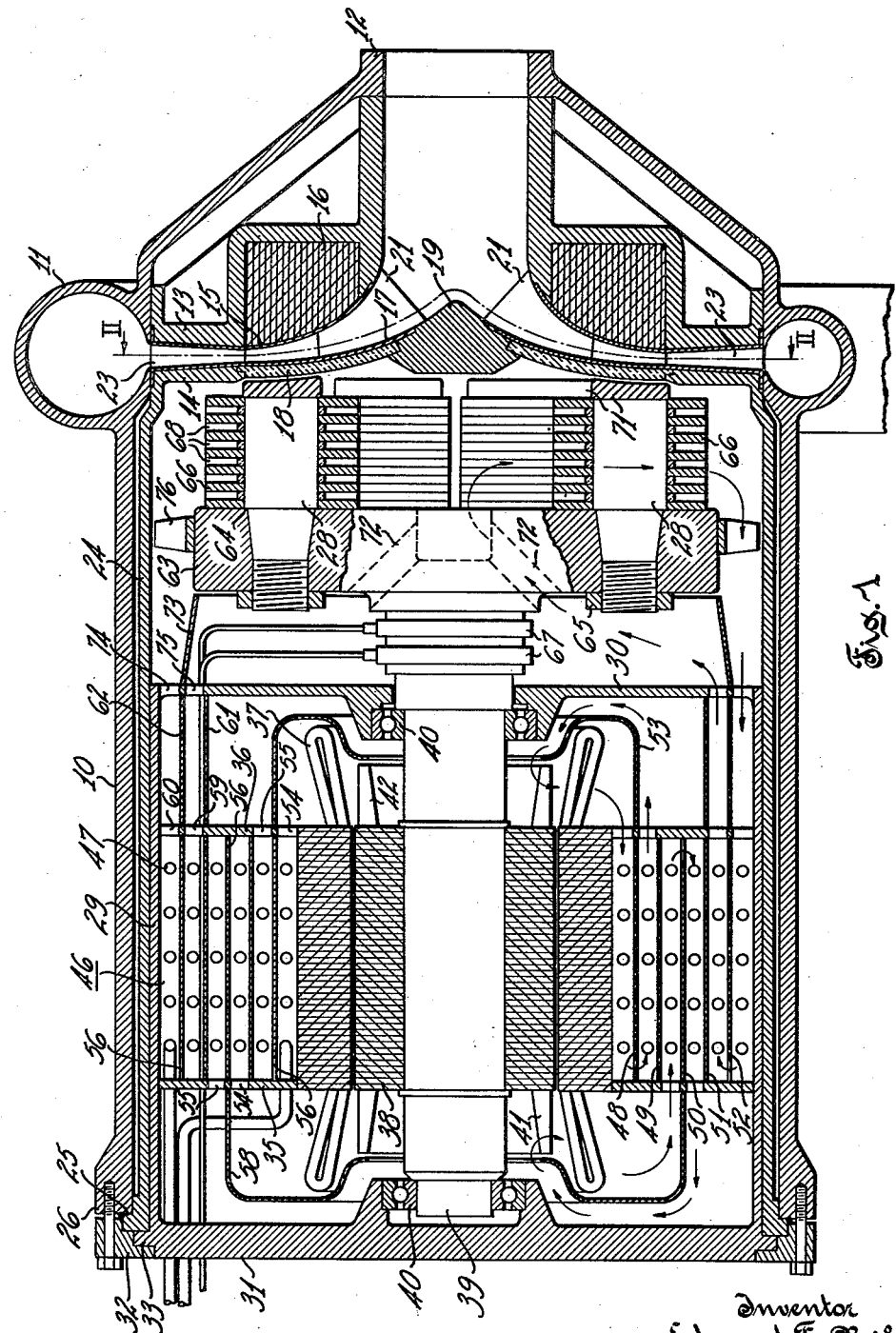
Fig. 1 is a longitudinal sectional view of a unit electromagnetic centrifugal pump and motor embodying the present invention.
Figure 2:
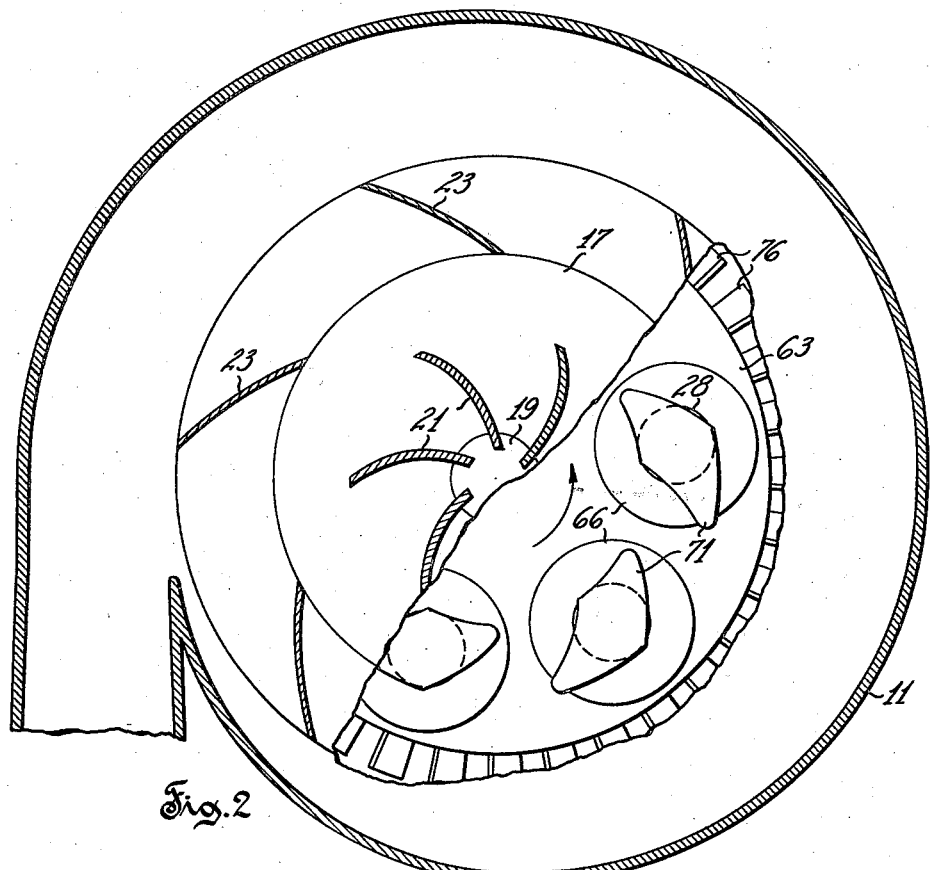
Fig. 2 is a sectional view taken along the line II—II of Fig. 1 with a portion of annulus housing broken away.

Referring to the drawings, the electromagnetic centrifugal pump is shown in combination with a drive motor and a cooler all enclosed in a main housing. The main housing comprises a tubular portion 10, the pump volute or discharge portion 11, and the pump inlet portion 12. Spaced walls 13, 14 define an annulus connecting the pump inlet and discharge portions, for the flow therein of an electrically conductive fluid. The material of the pump walls in contact with the fluid is made of suitable material not reactive chemically therewith, such as stainless steel when the conductive fluid is a liquid metal such as sodium, sodium potassium alloy, or lithium.

Wall 13 is suitably secured as by welding to a flange of volute 11 and to inlet 12 and includes a relatively thin annular plate 15 backed by a stationary spirally wound laminated core 16 disposed concentrically of inlet 12. Wall 14 forms a disk secured to the other flange of the volute 11. Wall 14 comprises a central hub 19 and a relatively thin annular plate 17 secured thereto spaced coaxially of plate 15. A heat barrier comprising an insulating ring 18 of ceramic material backs plate 17 and is secured thereto in any suitable manner, such as by being clamped between plate 17 and shoulders in wall 14 and hub 19. Suitable guide or prewhirl vanes 21 are disposed in the inlet of the pump and are secured to opposite walls thereof to make the annulus rigid and to give to the fluid a predetermined angular velocity as it enters the annulus within the effective region of the magnetic field.

Figure 3:
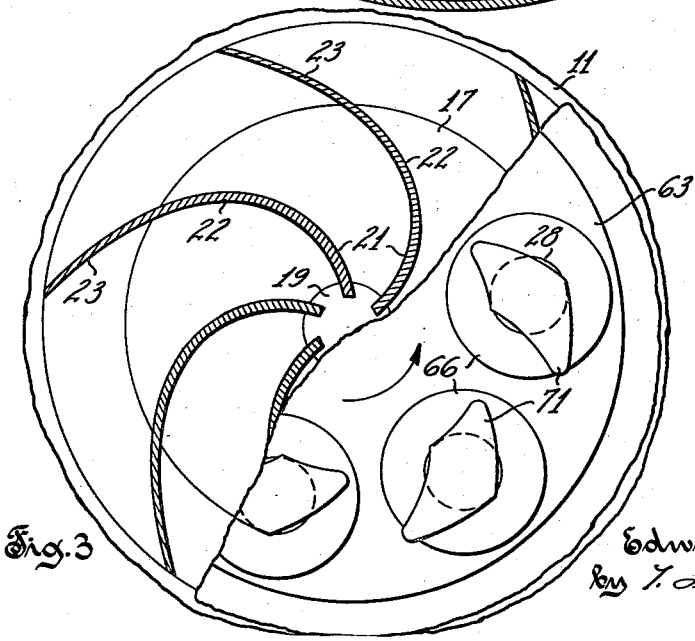
Fig. 3 is a modification of the guide vane structure shown in Fig. 2.

Vanes 22, as in the modification shown in Fig. 3, may be added between plates 15 and 17 within the region of the magnetic field to further strengthen such relatively thin plates. Vanes 22, if added, should continue vanes 21 and have a curvature corresponding to the desired flow path of the fluid through the magnetic field.

Diffuser vanes 23 are secured between walls 13 and 14 and extend from the outer periphery of the magnetic field to the volute 11. The diffuser vanes 23 continue the vanes 22, and the guide vanes 21, 22, 23 form a smooth curved path between inlet and discharge of the pump. The diffuser vanes 23 are the same as the diffuser vanes for a centrifugal pump having a mechanical impeller.

Wall 14 is also the bottom of a cup shaped member comprising a tubular member 24 having an annular shoulder 25 at its open end. Shoulder 25 abuts the end 26 of tubular portion 10 of the main or outer housing.

Field poles 28 for producing the rotating magnetic field and drive means for rotating the field poles are housed within the cup shaped member.

The field structure and drive means are made as a single unit and comprise an electric motor supported in a tubular frame 29 secured between end plates 30, 31. Frame 29 is removably inserted in tubular member 24, and a shoulder portion 33 of end plate 31 axially abuts the shoulder 25 of tubular member 24. A clamping ring 32 is bolted to the end of housing 10 to secure the motor axially in member 24 and to secure member 24 axially in housing 10. Tubular member 24 is made fluid tight with housing 10 by welding shoulder 25 to the end of housing 10. This weld may be cut when necessary to remove tubular member 24. Tubular member 24 is an axial extension of annulus wall 14 and forms a housing for the motor.

The motor comprises a stator core suitably secured in frame 29 by end rings 35, 36 and provided with an axially extending armature winding 37. A rotor 38 disposed within the stator is mounted on a rotatable shaft 39 supported in suitable bearings 40 in end plates 30, 31. Fan means comprise fans 41, 42 at each end of the rotor. Each fan comprises blading extending axially of the rotor in a well known manner.

A heat exchanger or cooler 46 for the ventilating gas comprises a plurality of layers and turns of tubing 47 disposed concentrically of the stator core between end rings 35, 36. The turns are spaced axially of one another and the layers are spaced circumferentially from each other by tubular baffles 48 to 52 which subdivide the cooler into a plurality of concentric chambers for the flow of ventilating gas axially therethrough.

A suitable end shield 53 at one end of the motor is suitably secured to end ring 36. Shield 53 encloses the end turns of the stator winding and forms a guide directing ventilating gas to the inlet of fan 42. A plurality of circumferentially spaced apertures 54, 55 in end ring 36 provide inlet and outlet ports to the cooler. Baffle 48 also has circumferentially spaced apertures 56. Thus, ventilating gas from fan 42 is forced radially over end turns of the stator winding through ports 54 axially through the cooler on one side of baffle 48, then through apertures 56 and axially back through the cooler on the other side of baffle 48 to return to fan 42. An end shield 58 similarly cooperates with fan 41 for ventilating the end turns at the other end of the machine. The shield is aligned with baffle 50, between inlet ports 54 and outlet ports 55 in end ring 35.

A similar pass through the cooler is provided for the ventilating gas for the rotating field poles by baffles 51, 52, aperture 56 in baffle 52, and apertures 59 and 60 in end ring 36. Baffles 51 and 52 are axially extended by tubular members 61, 62, respectively, secured between end ring 36 and end plate 30. This arrangement not only provides a separate path through the cooler for the ventilating gas for the rotating field poles but completely separates such ventilating gases from each other and also provides separate paths through the cooler for ventilating gas circulated by rotor fan 41 from that circulated by fan 42.

Field poles 28 are part of a field structure mounted on the extended portion of the rotor shaft 39. The field structure comprises an annular yoke 63 having pole receiving apertures. A shoulder 64 on each pole abuts one side of the yoke. The end of the field pole is threaded and has a nut 65 thereon which is drawn up tight against the other side of the yoke. The field poles are provided with coils 66 suitably connected to each other and to slip rings 67. Slip rings 67 are mounted on the rotor shaft between the overhung field structure and the adjacent bearing. The slip rings are connected through suitable brushes and leads to a source of excitation current, and the field poles connected so that adjacent field poles produce magnetic poles of opposite polarity. The pole faces are dimensioned to cover about one-half of the annulus area traversed by the pole faces. This results in a flux wave that is nearly sinusoidal and effects minimum flux leakage between poles. If the poles cover too much of the annulus the poles may be connected so that each pair of field poles produce a magnetic pole and the adjacent pairs of field poles produce magnetic poles of opposite polarity. This latter arrangement reduces the leakage flux between poles for a machine having a relatively large number of poles such as a twelve pole field structure which may be reconnected to produce six magnetic poles.

The field poles are disposed coaxially of the annulus and stationary core 16. The field poles are provided with pole pieces 71 having concave faces to correspond to the surface of annulus plate 17 and are spaced from its backing ring 18 only for running clearance. For obtaining the most effective flux distribution in the annulus, the pole pieces are skewed or shaped so their leading and trailing edges are curved to be substantially at right angles to the desired flow path of the liquid metal in the annulus in the manner of a mechanical impeller. The fluid moving circumferentially and radially through the annulus can be said to see a moving magnetic field substantially in line with its path. Maximum pumping action is thereby obtained.

The field poles and pole pieces act as a fan for circulating ventilating gas over the field structure. To facilitate such cooling the field coils 66 are constructed of a plurality of spaced layers of spirally wound or pancake type turns. The radially inner end of one layer is connected such as by brazing to the radially inner end of an adjacent layer and the radially outer end of the one layer is connected to the radially outer end of the other adjacent layer so that the coil turns are connected in series. Suitable radially extending spacers 68 disposed between layers provide radial ventilating spaces. The spacers also act as fans moving the ventilating gas radially outward over the field coils and between the layers of coil turns. Yoke 63 is provided with apertures 72 for the passage of ventilating gas therethrough from the region of the slip rings 67 to the space between the field poles. A tubular baffle 73 mounted on end plate 30 abuts baffle 62. Fan blading 76 may also be added to the periphery of yoke 63 to aid the pole pieces to force ventilating gas to circulate radially over the field poles, axially in the channel formed between baffle 73 and tubular member 24 through apertures 74 in end plate 30, thence through aperture 60 in end plate 36 to the cooler, through aperture 56 in cooler baffle 52 back through the cooler and through apertures 75 in end plate 30 to the region of the slip rings, and thence through apertures 72 in yoke 63 back to the field poles.

In operation of the electromagnetic pump, the motor armature winding is energized to cause rotation of the field structure and the slip rings are connected to a suitable source of excitation current. Liquid metal in the annulus cuts lines of flux of the rotating magnetic field and has voltages induced therein producing eddy currents. These currents react with the field flux causing rotation of the liquid metal which tends to follow the rotating field. The inlet vanes 21 give the liquid metal a prewhirl or prerotation so that the liquid metal enters the magnetic field having a predetermined angular velocity. The impeller action of the magnetic field increases the velocity of the liquid metal and the diffuser vanes 23 convert this velocity into pressure in guiding the liquid metal to the discharge volute.

From the embodiment of this invention shown and described it will be apparent to one skilled in the art that various changes or modifications may be made therein without departing from the spirit of the invention or from the scope of the appended claims.

It is claimed and desired to secure by Letters Patent:

1. An electromagnetic centrifugal pump for an electrically conductive fluid, said pump comprising spaced walls defining an annulus, an inlet duct and a discharge volute for the flow of the fluid therethrough, prewhirl vanes disposed in said inlet duct for giving the fluid a predetermined angular velocity as it enters said annulus, a rotatable field member disposed coaxially of said annulus, said field member comprising a plurality of field poles provided with field coils for producing a magnetic field traversing said annulus substantially perpendicularly thereto, said field poles having pole faces adjacent the annulus, said pole faces having leading and trailing edges disposed substantially at right angles to the flow of the fluid in its path through the magnetic field, means connecting said field coils to a source of direct current and means rotating said field member for rotating said magnetic field in said annulus to pump said fluid from said inlet duct to said discharge volute.

2. An electromagnetic centrifugal pump for an electrically conductive fluid, said pump comprising spaced walls defining an annulus, an inlet duct and a discharge volute for the flow of the fluid therethrough, prewhirl vanes disposed in said inlet duct for giving the fluid a predetermined angular velocity as it enters said annulus, a rotatable field member disposed coaxially of said annulus, said field member comprising a plurality of field poles provided with field coils for producing a magnetic field traversing said annulus substantially perpendicularly thereto, said field poles having pole faces adjacent the annulus, said pole faces having curved leading and trailing edges disposed substantially at right angles to the flow of the fluid in its path through the magnetic field, diffuser vanes disposed in said volute extending radially outward from the region of the magnetic field to change the velocity of said fluid leaving the magnetic field to a pressure in said volute, means connecting said field coils to a source of direct current and means rotating said field member to rotate said magnetic field to cause pumping of said fluid to said discharge volute.

3. An electromagnetic centrifugal pump for an electrically conductive fluid, said pump comprising spaced walls defining an annulus, an inlet duct and a discharge volute for the flow of the fluid therethrough, prewhirl vanes disposed in said inlet duct for giving the fluid a predetermined angular velocity as it enters said annulus, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus comprising heat resistant material to limit the transfer of heat from said annulus to said field poles, diffuser vanes disposed in said volute extending radially outward from the region of the magnetic field to change the velocity of said fluid leaving the magnetic field to pressure in said volute, means connecting said field coils to a source of direct current and means rotating said field member to rotate said magnetic field to cause pumping of said fluid from said inlet duct to said discharge volute.

4. An electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, means connecting said field coils to a source of direct current and means rotating said field member to rotate said magnetic field in said annulus to cause pumping of said fluid from said inlet duct to said discharge volute.

5. In combination, an electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus extending axially to form a tubular housing, an electric motor removably disposed within said tubular housing, said motor comprising a rotatable shaft, said rotatable field member for said pump mounted on one end of said shaft for rotation therewith, means connecting said field coils to a source of excitation current, and means operating said motor to rotate said magnetic field in said annulus to cause pumping of said fluid from said inlet duct to said discharge volute.

6. In combination, an electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus extending axially to form a tubular housing, a gas cooled electric motor removably disposed within said tubular housing, said motor comprising a cooler, a stator having an axially extending winding, and a rotatable shaft, a fan rotatable with said shaft to circulate ventilating gas over the end turn portions of said stator windings and through said cooler, said rotatable field member for said pump mounted on one end of said shaft for rotation therewith, said rotatable field member acting as a fan causing ventilating gas to circulate radially between said field poles and through said cooler, means connecting said field coils to a source of excitation current, and means operating said motor to rotate said magnetic field in said annulus to cause pumping of said fluid from said inlet duct to said discharge volute.

7. In combination, an electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus extending axially to form a tubular housing, a gas cooled electric motor removably disposed within said tubular housing, said motor comprising a stator having an axially extending winding, a rotatable shaft, a cooler disposed circumferentially of said stator, a fan rotatable with said shaft forcing ventilating gas over the end turns of said stator windings axially through said cooler from one end of the motor to the other end thereof and back to said fan, said rotatable field member for said pump mounted on one end of said shaft for rotation therewith, means connecting said field coils to a source of excitation current, means operating said motor to rotate said magnetic field in said annulus to cause pumping of said fluid from said inlet duct to said discharge volute, said field member when rotated acting as a fan forcing ventilating gas over said field poles, axially through said cooler and back to said field member, and a baffle in said cooler separating ventilating gas for said field member from the ventilating gas for said motor.

8. In combination, an electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus extending axially to form a tubular housing, a totally enclosed gas cooled electric motor removably disposed within said tubular housing, said motor comprising a cooler, a stator having an axially extending winding, a rotatable shaft, a fan rotatable with said shaft forcing ventilating gas over the end turns of said stator windings and through a portion of said cooler, said rotatable field member for said pump mounted on one end of said shaft for rotation therewith, means connecting said field coils to a source of excitation current, means operating said motor to rotate said magnetic field in said annulus to cause pumping of said fluid from said inlet duct to said discharge volute, and means forcing ventilating gas over said field poles and through a second portion of said cooler, means separating said first and second portion of said cooler so that their ventilating gases do not mix.

9. An electromagnetic centrifugal pump for an electrically conductive fluid, said pump comprising a stationary laminated annular core, a rotatable field member disposed coaxially of said core to define an axial air gap therebetween, spaced walls defining an annulus within said gap, said annulus having an inlet duct and a discharge volute for the flow of said fluid therethrough, said walls being of thin material not strong enough without reinforcement to contain said fluid under operating pressure, means reinforcing said walls comprising said core backing one of said walls, and vanes disposed in said annulus secured to both said walls, each of said vanes being a continuous member extending from said inlet duct to said discharge volute to guide said fluid through said annulus from said inlet duct to said discharge volute, the portion of said guide vanes extending radially outward from the region of the magnetic field serving as diffuser vanes to change the velocity of said fluid leaving the magnetic field to pressure in said volute, said field member comprising a plurality of field poles provided with field coils for producing a magnetic field traversing said annulus substantially perpendicularly thereto, said field poles having pole faces adjacent the annulus, said pole faces having leading and trailing edges disposed substantially at right angles to the flow of the fluid in its path through the magnetic field, means connecting said field coils to a source of direct current and means rotating said field member for rotating said magnetic field in said annulus to pump said fluid from said inlet duct to said discharge volute.

10. In combination, an electromagnetic centrifugal pump for an electrically conductive fluid, said pump comprising spaced walls defining an annulus, an inlet duct and a discharge volute for the flow of the fluid therethrough, a rotatable field member disposed coaxially of said annulus, said field member comprising a plurality of field poles provided with field coils for producing a magnetic field traversing said annulus substantially perpendicularly thereto, said field poles having pole faces adjacent one wall of the annulus, said pole faces having curved leading and trailing edges disposed substantially at right angles to the flow of the fluid in its path through the magnetic field, said one wall of said annulus extending axially to form a tubular housing, a rotatable shaft and a cooler disposed in said housing, said rotatable field member for said pump mounted on one end of said shaft for rotation therewith, means connecting said field coils to a source of excitation current, means driving said shaft to rotate said magnetic field in said annulus to cause pumping of said fluid from said inlet duct to said discharge volute and a fan mounted on said field member for rotation with said shaft forcing ventilating gas in a path through said cooler, over said field poles and back to said fan.

References Cited in the file of this patent

UNITED STATES PATENTS

| 2,651,258 | Pierce | Sept. 8, 1953 |
| 2,652,778 | Crever | Sept. 22, 1953 |
| 2,669,931 | Godbold | Feb. 23, 1954 |

FOREIGN PATENTS

| 661,756 | Great Britain | Nov. 28, 1951 |